Nov. 5, 1935. L. J. LARSON 2,020,278

ELECTRIC ARC CONTROL FOR WELDING

Filed June 15, 1934

INVENTOR.
Louis J. Larson
BY
ATTORNEY.

Patented Nov. 5, 1935

2,020,278

UNITED STATES PATENT OFFICE 2,020,278

ELECTRIC ARC CONTROL FOR WELDING

Louis J. Larson, Milwaukee, Wis., assignor to A. O. Smith Corporation, Milwaukee, Wis., a corporation of New York Application June 15, 1934, Serial No. 730,720

9 Claims. (Cl. 219—8)

This invention provides an efficient and sensitive welding arc control device and is particularly adaptable to automatic weldrod feeding devices of the clutch-driven type.

Figure 1:
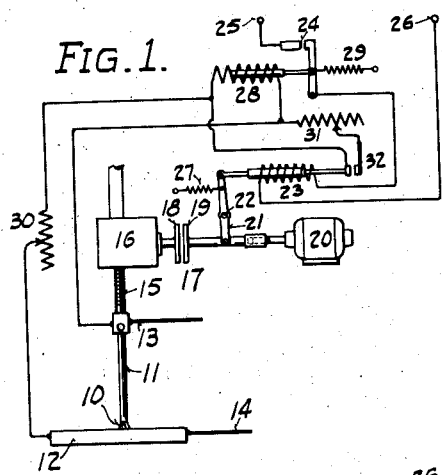

Referring to the appended drawing:

Figure 1 is a schematic drawing of a weldrod feeding device embodying the invention.

Figs. 2, 3, 4, 5, and 6 are schematic drawings embodying modified forms of the invention.

Referring to Fig. 1, 10 represents a welding arc sprung between a weldrod 11 and a work piece 12. Welding current leads 13 and 14 supply welding energy to the arc and may be connected to any source of electric energy that is suitable to impart desirable characteristics to the arc for welding. The weldrod 11 is shown as attached to the end of a weldrod feeding screw 15 which in turn is driven by means of a gear reduction 16 from a clutch 17 having fixed and reciprocable rotating members 18 and 19, respectively. Reciprocable member 19 is rotated by any suitable driving means such as motor 20. A continuous constant speed of such rotation is satisfactory.

The rate of rotation of clutch member 19 is determined by the ratio of the speed reduction 16, the desired rate of consumption of weldrod 11 and the amount of excess weldrod feeding rate that it is found desirable to have to make the rate of adjustment of the arc sensitive to rapid changes of said arc. It is desirable to employ a speed of member 19 considerably in excess of that corresponding to the average rate of consumption of weldrod 11.

Clutch member 19 is reciprocated into contacting or driving relation with driven member 18 and into open or non-driving position by means of lever 21 pivoted at point 22. Magnetic solenoid 23 serves to engage clutch 17 when auxiliary contact 24 closes the electric circuit connecting said coil 23 to the source of electric energy 25—26. Spring 27 serves to disengage clutch 17 and discontinue the feed of weldrod 11 when coil 23 is de-energized by the opening of contact 24.

With motor 20 rotating at a selected speed, when the arc becomes long and the arc voltage high the engaging of the clutch 17 causes the weldrod 11 to be quickly fed toward the work and the arc shortened and the voltage reduced. And when the arc is short, by disengaging clutch 17, all feed of rod 11 is discontinued, and the arc consumes the weldrod, lengthening the arc and increasing the voltage across the arc. These operations are automatically performed by the closing and opening of contact 24 by means of solenoid 28 which is here shown as connected directly across the arc at points 12 and 13 and is responsive to the voltage of the arc.

When the voltage of the arc becomes great enough, solenoid 28 overcomes spring 29 and closes contacts 24, energizing solenoid 23, engaging clutch 17, and causes rod 11 to be fed toward the work 12. Conversely when the arc voltage becomes low the spring 29 overcomes the pull of solenoid 28, and the feed of rod 11 is discontinued. Resistance 30 is provided to adjust the current flowing in solenoid coil 28 and thereby obtain the desired voltage at the arc for the work to be performed.

Due to the natural friction and inertia of the parts of the apparatus an appreciable deviation of the arc length and voltage from the desired values for which the apparatus has been adjusted is necessary to cause clutch 17 to open or close. Such deviation from the desired optimum conditions is made greater also by the fact that a change from open to closed condition of the clutch changes the rate of feed of the electrode from zero to the maximum rate, which carries the correction beyond the desired condition.

Additional mechanism has been added to compel the apparatus to rapidly engage and disengage the rod feeding means when the arc characteristics approach their preferred values, thus providing a proper continued average speed of feed at the point of optimum arc conditions by the summation of many short time impulses of feeding action.

The above result is reached in the arrangement disclosed in Fig. 1 by the following means: An adjustable resistance 31 is connected in shunt to solenoid coil 28 through contacts 32. Resistance 31 is adjusted to by-pass a desired amount of current from coil 28 when contacts 32 close.

With this arrangement when the arc becomes sufficiently long and the arc voltage sufficiently high solenoid 28 closes contacts 24, solenoid 23 is energized, the clutch 17 closed, and the feed of the weldrod started. Immediately upon the closing of clutch 17, however, contacts 32 are closed, coil 28 shunted through resistance 31, and the pull of solenoid 28 is weakened by the amount of the shunted current. If the pull of solenoid 28 is still greater than that of spring 29 because of the great length of the arc, contacts 24 will remain closed and the feed of the weldrod will continue at the maximum rate to quickly reduce the arc length. Such feed will continue until the weakened pull of solenoid 28 permits contacts 24 to open, whereupon the clutch 17 will be disengaged and the feed cease. But since the optimum arc conditions have not yet been reached and the shunt circuit has now been opened by the opening of clutch 17, full strength pull is restored to solenoid 28, whereupon it immediately closes contacts 24 and the feed is resumed, but immediately thereafter the resulting closing of contacts 32 again weakens the pull of solenoid 28 and its contacts again open. It will be seen that the apparatus is thereafter compelled to rapidly apply a series of feeding impulses to the weldrod feed, so long as the arc characteristics remain within that range near the optimum desired characteristics, determined by the setting of the shunting resistance 31. The feed will then return to a continued steady rapid condition only when some major disturbance of the arc takes place such as the encountering of a cavity in the work which suddenly lengthens the arc beyond the selected range.

Figure 2:
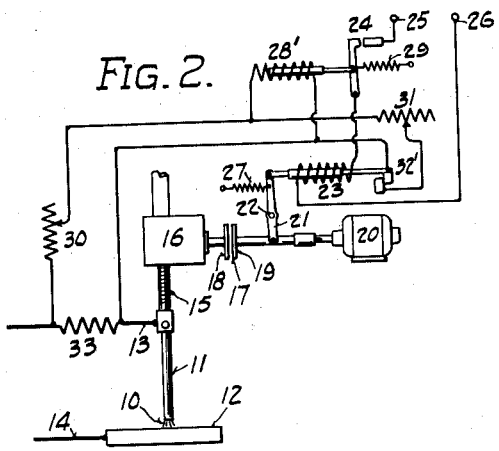

Fig. 2 is a diagrammatic drawing of a modified form of apparatus embodying the invention, in which the control of the arc is effectuated in response to the current flowing in the arc. Solenoid 28' is connected in shunt to resistance 33 which is in series with the arc current. The current in solenoid 28' is in proportion to the arc current. Contacts 24 have been arranged in Fig. 2 to open when the pull of solenoid 28' becomes sufficiently large, whereas in Fig. 1, where coil 28 was across the arc voltage, contacts 24 were arranged to close when the pull of solenoid 28 increased to a predetermined value. Contacts 32' have likewise been changed in Fig. 2, so that they open when the clutch closes; whereas, in Fig. 1 they closed when the clutch closed.

The operation of the mechanism in Fig. 2 is as follows:

If the clutch 17 is open and no feed of the rod 11 is taking place, contacts 32' are closed and the pull of solenoid 28' is weakened by the current shunted through resistance 31. If the arc lengthens sufficiently the current in the arc and also in coil 28' is reduced, and when a given value is reached the pull of solenoid 28' will be reduced to a point at which spring 29 will close contacts 24. The clutch will then close, feeding weldrod 11 toward the work. But immediately upon the closing of clutch 17, contacts 32' are opened, thereby opening the shunt circuit to coil 28'. The pull of solenoid 28' is thereby increased and then causes contacts 24 to open. The cycle of operation is then repeated as described in connection with Fig. 1 and will continue as long as the arc characteristics are within the adjusted range.

Figure 3:
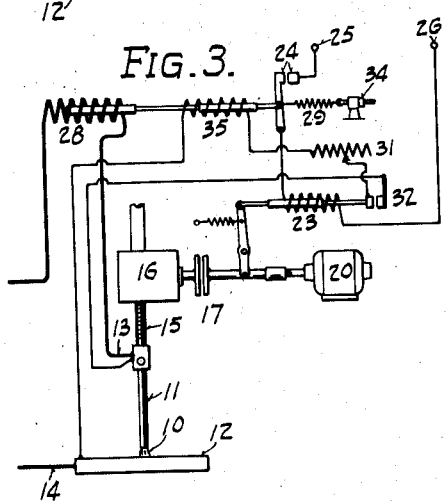

Fig. 3 shows an additional manner of obtaining the positive vibrating action of the control mechanism and a regular continued series of weldrod feeding impulses for a selected optimum range of arc characteristics.

The operation of the arrangement shown in Fig. 3 is much the same as that of Fig. 2. Coil 28 is operated by the current flowing through the arc, being in this case a coil in series with the arc instead of one in shunt to a resistor in series with such arc current as was the case in Fig. 2. Since no adjustment resistance is now provided to adjust the action of solenoid 28 for various desired arc lengths, an adjustment screw 34 is provided for spring 29 for setting the device to maintain a given arc length. When the pull of solenoid 28 becomes sufficiently weak to permit spring 29 to close contacts 24, coil 23 is energized and clutch 17 closed, causing the weldrod to be fed toward the work, whereupon contacts 32 are closed and newly provided solenoid 35 placed across the arc through connections in series with resistance 31. This arc shunt coil 35 then adds to the pull on spring 29 and causes contacts 24 to open and stop the weldrod feed. In this manner the desired vibrating action of the feeding mechanism is produced.

During the vibrating motion, in all of the mechanisms here described, the ratio of the time during which the feed takes place to the total time varies with small variations in the arc characteristics. This ratio at the condition of optimum arc characteristic is approximately the ratio of the average rate of weldrod consumption to the maximum rate at which motor 20 feeds the rod when the clutch is engaged. This ratio increases as the arc lengthens above the optimum or predetermined arc length and decreases when the length of the arc is below such value.

Figure 4:
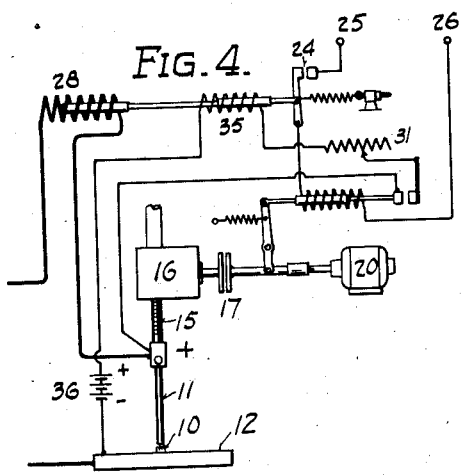

In Fig. 3 some advantage is gained by the employment of coil 35 connected across the arc, since the longer the arc, the stronger the pull in coil 35, and the quicker it operates to reopen contacts 24. Still greater sensitivity can be obtained by connecting a battery in series with the connections of coil 35 and opposed to the voltage of the arc. Such an arrangement of the circuit of coil 35 is shown in Fig. 4, in which battery 36 is opposed to the arc voltage in the circuit of coil 35.

In Fig. 3 coil 35 can also be connected across any source of constant potential and function in the combination to produce the desired vibrating action of the weldrod feeding mechanism.

In all of the figures so far described the source of energy 25—26 to the solenoid operating the clutch can be the arc circuit.

Figure 5:
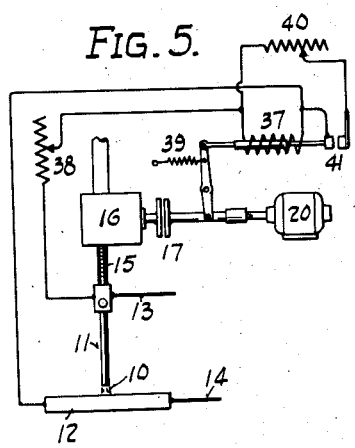
Figure 6:
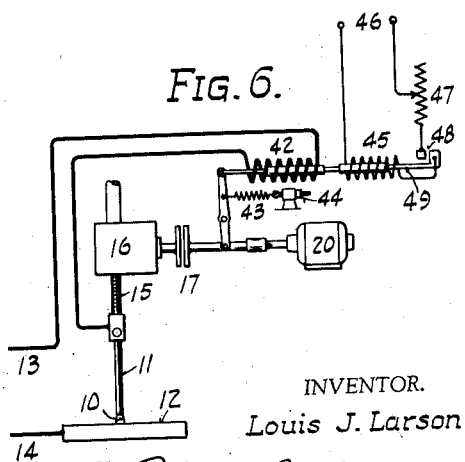

There is some advantage in employing one mechanism directly responsive to the arc characteristics to control the operation of a further mechanism which operates the electrode feeding means as shown in the devices already described. However, it is possible to obtain the desired forced impulse feed of the weldrod when the clutch operating solenoid is itself directly responsive to the arc characteristics without the intervention of a separate magnetic unit applied to the arc. Figs. 5 and 6 illustrate such arrangements.

In Fig. 5 shunt coil 37 which is employed to operate the clutch drive for the weldrod feeding device is connected directly across the arc through adjusting resistance 38 and is arranged to engage the clutch and feed the electrode toward the arc when the arc voltage rises to a selected value and spring 39 operates to open the clutch and discontinue such feed when the arc shortens and its voltage lowers to a given value.

In addition a resistance 40 is connected in shunt to solenoid coil 37 through contacts 41 which are open when clutch 17 is disengaged and closed when said clutch is engaged.

When the arc voltage rises to a sufficiently high value to cause solenoid 37 to overcome spring 39 clutch 17 is engaged and the electrode fed toward the arc, but immediately therein contacts 41 close and the pull of coil 37 is weakened by the short circuiting of a part of its current through resistance 40. Spring 39 overcomes the weakened pull of coil 37 and the clutch is then disengaged. A succession of such impulse cycles of feeding are then imposed upon the electrode.

In Fig. 6 solenoid 42 is placed in series with the arc and is arranged to open the clutch 17 when the arc becomes short and the current flowing therein sufficiently large to overcome spring 43 which is adjusted for a given arc length by nut 44. Magnet 45 which is connected to voltage source 46 through resistance 47 and contacts 48 on the clutch operating rod 49 is arranged to oppose the pull of coil 42. Immediately upon the opening of clutch 17 contacts 48 close, coil 45 opposes the pull of coil 42 and so weakens it that spring 43 closes clutch 17 and the rod feed is resumed. These cycles of impulse drives of electrode 11 toward the arc 10 is forced to continue as in the previous illustrations of the invention.

No arc striking mechanism is shown in any of the drawings but any suitable mechanism may be employed. Mechanisms completely satisfactory for such use are shown in the Patent, No. 1,930,290, to Richard Stresau.

Exceptionally senstive and satisfactory control of the welding electrode feed and the welding arc characteristics is obtained by the practice of the above-described invention. Various modifications of disclosures herein included may be made by one skilled in the art without departing from the spirit of the invention described and claimed.

I claim:

1. A welding electrode feeding device comprising means under the control of a characteristic of the arc to automatically feed said electrode to the arc and means actuated by the feeding movement initiation to compel said feeding mechanism to feed said electrode by a sustained series of impulse feedings when the arc characteristics are at or near their optimum for which the feeding device is adjusted.

2. A welding electrode feeding device comprising means under the control of a characteristic of the arc to automatically feed said electrode to the arc and means actuated by the engagement of the feeding means to compel said feeding mechanism to feed said electrode by a sustained series of regular intermittent feeding impulses in which the ratio of the feeding time to the total time increases as the average arc voltage rises, and decreases as the average arc voltage decreases.

3. An automatic arc welding electrode feeding device comprising clutch-driven means to feed said electrode toward the welding arc, magnetic means controlled by a characteristic of said arc to engage and disengage said clutch, and means actuated by the engagement of the feeding means to compel said magnetic means to actuate said driving clutch in a series of driving impulses for all values of the arc characteristics within a selected range at and near the desired arc condition.

4. An automatic arc welding electrode feeding device comprising a magnetic relay, the actuating coil of which is connected in shunt to the arc, a magnet operated clutch feeding mechanism actuated by said relay for feeding the electrode to the work, and means responsive to said clutch mechanism to modify the action of the arc upon said relay and force the feeding mechanism to operate in intermittent impulses within a selected range of arc characteristics.

5. An automatic feeding mechanism for an arc welding electrode comprising an interruptable feeding device, a relay arranged to open and close under the influence of the current characteristic of the welding arc and effect the operation of said feeding device, and means responsive to said feeding device to modify the action of the arc current upon said relay to regularly interrupt the feeding of said electrode.

6. An automatic feeding mechanism for an arc welding electrode comprising an interruptable feeding device, means under the control of a characteristic of the arc current to engage and disengage said feeding device and thereby effect the feeding of said electrode and means responsive to the movements of said feeding device to modify the action of said arc current characteristic upon said first named means to regularly interrupt the feeding of said electrode when the arc current characteristics are near the optimum values for which the device is adjusted to thereby increase the sensitivity of control of the rod feed.

7. An automatic feeding mechanism for an arc welding electrode comprising a continuously operative feeding device, means under control of a characteristic of the welding current to engage and disengage said feeding device, and electric current conducting means superimposing upon said welding current characteristic modifications thereof to cause the engagement and disengagement of said feeding device to assume a rapid periodicity at and near the optimum condition of said arc current characteristic for which the apparatus is adjusted.

8. An automatic feeding mechanism for an arc welding electrode comprising a continuously operative feeding device, means under control of a characteristic of the welding current to engage and disengage said feeding device, and electric current conducting means superimposing upon said welding current characteristic modifications thereof to cause the engagement and disengagement of said feeding device to assume a rapid periodicity at and near the optimum condition of said arc current characteristic for which the apparatus is adjusted, and to permit the feeding device to feed continuously when the lengthening of the arc changes said arc current characteristic a predetermined amount from said optimum.

9. An automatic feeding mechanism for an arc welding electrode comprising a continuously operative feeding device, means under control of a characteristic of the welding current to engage and disengage said feeding device, and electric current conducting means superimposing upon said welding current characteristic modifications thereof to cause the engagement and disengagement of said feeding device to assume a rapid periodicity at and near the optimum condition of said arc current characteristic for which the apparatus is adjusted and cause the ratio of the time of feed to the total time of said period to increase as the said arc current characteristic is changed within said optimum range by the raising of the voltage across said arc.

LOUIS J. LARSON.